Sept. 27, 1955　　　W. J. BLOOMER ET AL　　　2,718,757
AIRCRAFT GAS TURBINE AND JET
Filed Jan. 17, 1951　　　　　　　　　　　　2 Sheets-Sheet 1
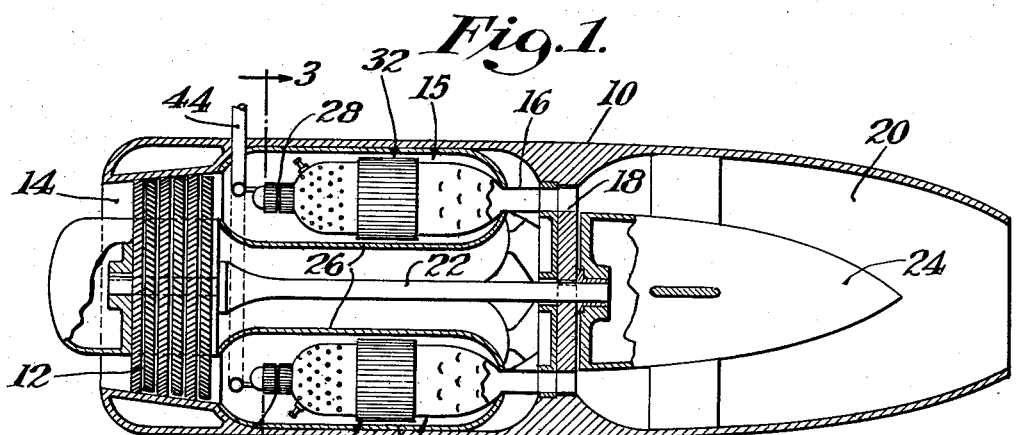
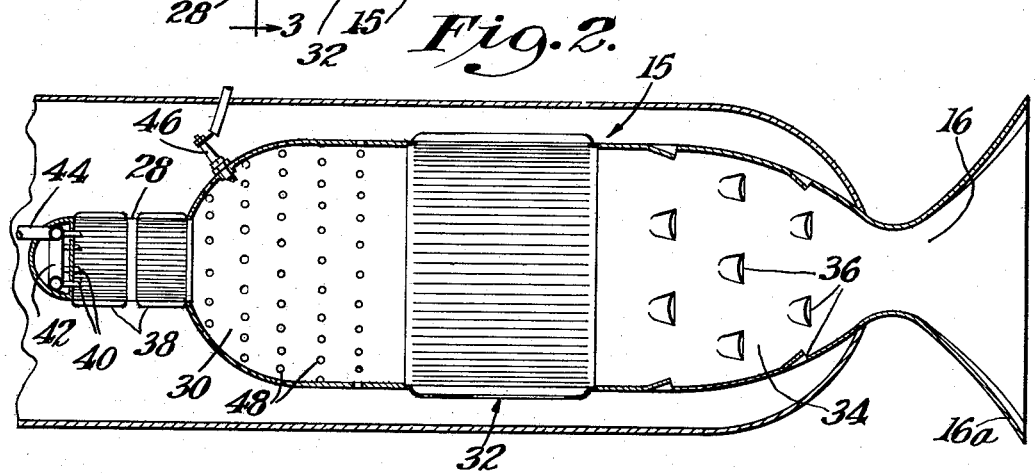
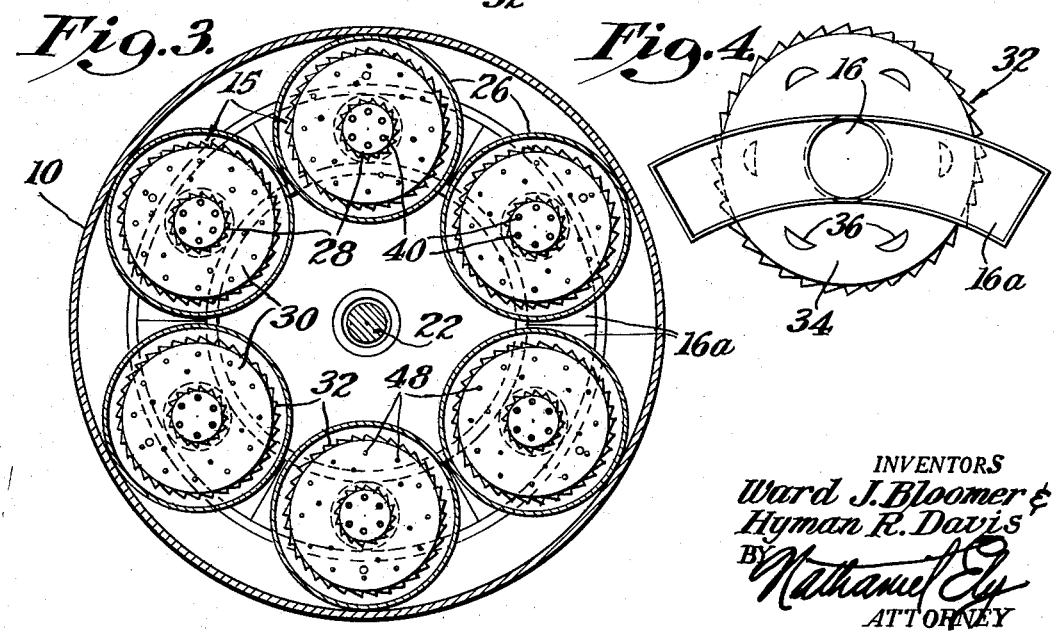
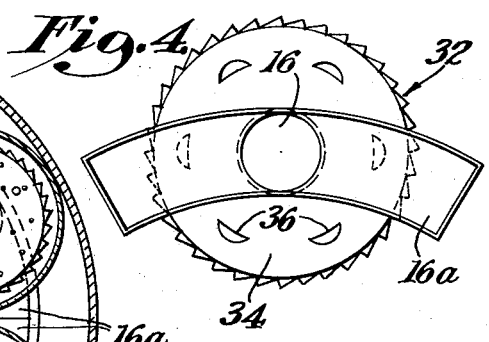
INVENTORS
Ward J. Bloomer &
Hyman R. Davis
BY Nathaniel Ely
ATTORNEY Sept. 27, 1955    W. J. BLOOMER ET AL    2,718,757
AIRCRAFT GAS TURBINE AND JET
Filed Jan. 17, 1951    2 Sheets-Sheet 2
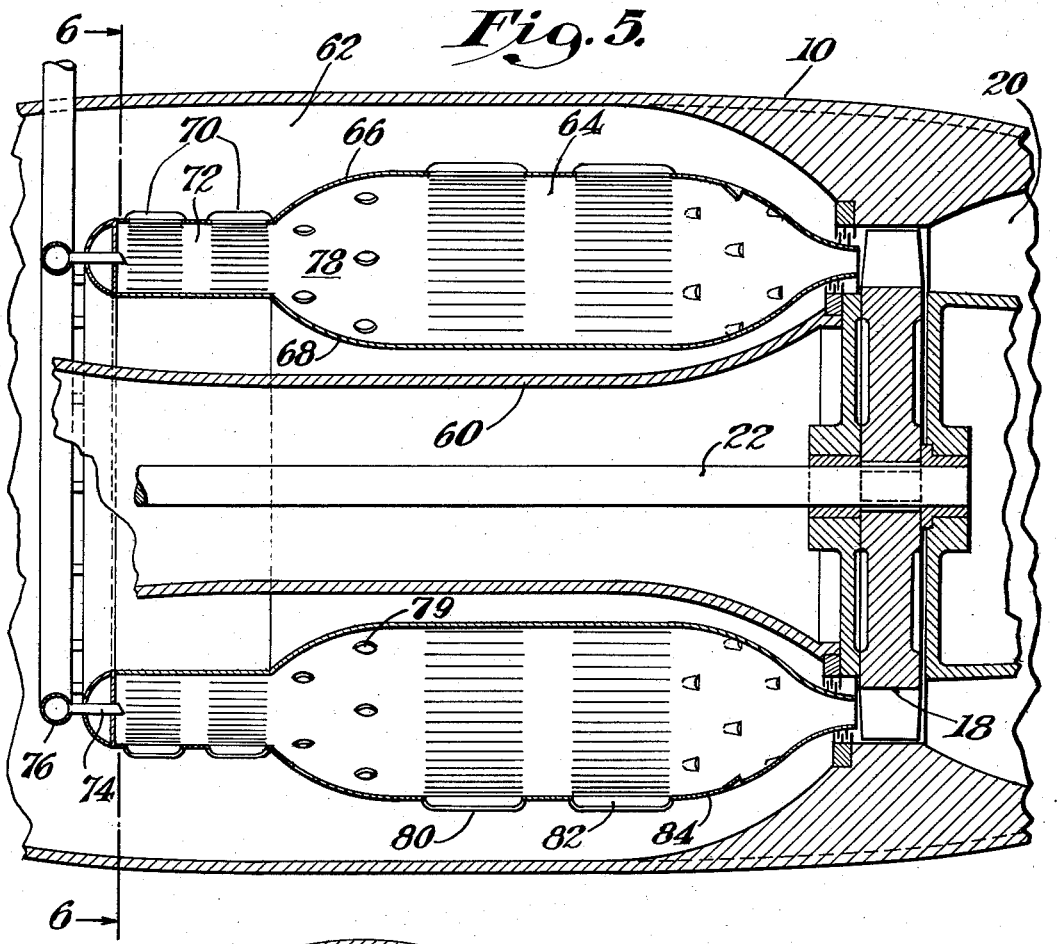
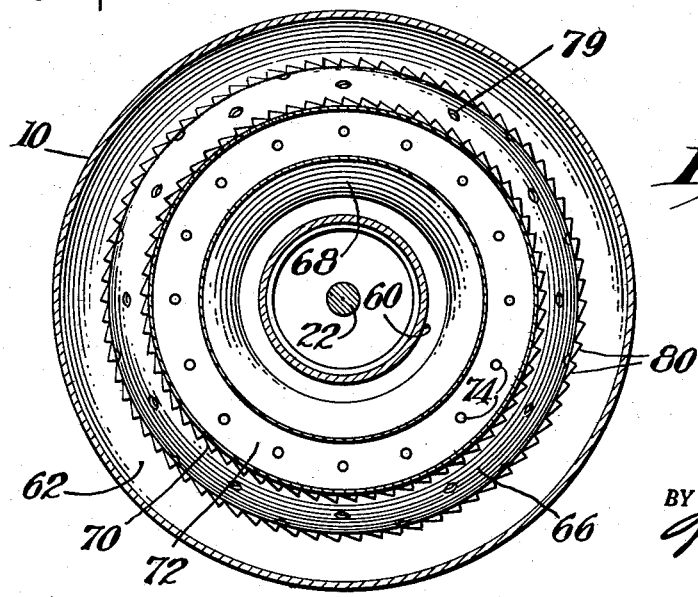
INVENTORS
Ward J. Bloomer &
BY Hyman R. Davis
Nathaniel Ely
ATTORNEY

2,718,757

AIRCRAFT GAS TURBINE AND JET

Ward J. Bloomer, Westfield, N. J., and Hyman R. Davis, Jackson Heights, N. Y., assignors to The Lummus Company, New York, N. Y., a corporation of Delaware Application January 17, 1951, Serial No. 206,424

2 Claims. (Cl. 60—39.65)

This invention relates to improvements in gas turbines. It is more particularly drawn to features of a self-contained power unit as used in aircraft construction utilizing a burner of the general type as shown and described in the copending application of Ward J. Bloomer Serial No. 98,214 and our application Serial No. 201,415, the latter now Patent No. 2,674,846, dated April 13, 1954.

With increasing power demands for aircraft, there has been a tendency to the use of jet engines as distinguished from reciprocating engine driven propeller engines. The jet cycle, in a highly simplified form, has a turbo-compressor, an air-fuel mixing device, a combustion chamber, a secondary air diluting device, the gas turbine for driving the compressor, and the jet discharge. The present invention is primarily related to an improved combustor which is adapted to receive, mix, and burn the air and fuel, and dilute the products of combustion with air for most effective operation. It is based on the discovery that vortical air-fuel mixing, followed by the vortical combustion of the mixture in a closed flame pattern, is unusually effective in completing combustion in a relatively short linear distance. It thus provides much higher heat releases in the same size combustion chambers than is normally possible with methods of fuel introduction and combustion practiced to date.

Our invention is thus of major significance to aircraft application in view of its minimum size, its maximum heat release and its relatively low weight.

Further objects and advantages of our invention will appear from the following description of preferred forms of embodiment thereof taken in conjunction with the attached drawing illustrative thereof, and in which:

Fig. 1 is a central vertical cross section diagrammatically showing a power plant unit of the jet type.

Fig. 2 is a central longitudinal cross section of a combustor unit on a larger scale.

Fig. 3 is a transverse vertical cross section generally taken on the line 3—3 of Fig. 1.

Fig. 4 is a front view of a combustor.

Fig. 5 is a central vertical cross section view showing a modified form of power plant having a continuous annular combustor.

Fig. 6 is a transverse view taken substantially on the line 6—6 of Fig. 5.

In a jet engine of the general class under consideration, the casing 10 is adapted to house a compressor 12 receiving air through inlet 14 and compressing it for discharge into the several combustors 15. These in turn discharge through a fan tail transition piece 16 through the turbine drive wheel 18 and thence to the jet discharge 20. Turbine wheel 18 drives the compressor 12 through shaft 22. The fairing 24 serves to prevent eddies in the jet discharge 20 and as a bearing for the turbine shaft. The transition piece 16 may have the fan tail 16a adapted to extend over its proportion of the turbine blade.

As more particularly shown in Figs. 2 and 3, the combustors 15 are each mounted in a shell casing 26 which is adapted to receive the air under pressure at the end adjacent the compressor 12. The combustor itself consists of the burner or air-fuel mixing device 28, the combustion zone chamber 30, the air diluting zone section 32, the cooling zone section 34 having air scoops 36, and the transition piece 16 previously described and extending through the discharge end of casing 26. Generally a plurality of combustors are used, of which six are shown in this construction.

An important feature of the burner or air-fuel mixer 28 is the arrangement of blades 38 preferably in two banks which are tangentially disposed and adapted to form a series of peripheral inlets for the air. As shown in Fig. 3, the blades are conveniently stamped from a metal sheet which may be formed into a cylinder; thereby permitting substantial economies. It is of course to be understood that overlapping blades may be used as in turbine practice.

Fuel is preferably introduced to the burner or tuyere 28 as by a plurality of coarse jets or nozzles 40, which are in communication with a common feed ring 42 supplied by feed line 44. These nozzles, of which six are most effective, are spaced from the axis and the side of the tuyere so that the oil or other fuel will be fed directly into the rotating air stream.

In operation, the air under pressure from compressor 12 enters the tuyere 28 through the air paths formed by blades 38 to create a vortical air column. Velocities of 30 ft. per sec. and higher are necessary. The fuel, under a relatively low head, discharges into the vortical column to become mixed, atomized and finely dispersed. This air-fuel mixture is then discharged outwardly as an annulus into the combustion chamber 30. Ignition by plug 46 will cause substantially instantaneous burning.

Burning is in a closed short flame pattern. Rotation started in the tuyeres 28 becomes greater in the hotter combustion chamber 30, resulting in a very short flame. The high velocity discharge of the vortical fuel-air column creates a central eddy of the flame into a central core of low pressure and this eddy is amplified by the rotation. Air openings 48 serve to cool the metal wall of combustion chamber 30.

Dilution and cooling of the products of combustion is accomplished by secondary tuyere 32, the blades of which may be positioned in the same direction as the blades in the burner 28. About 25% to 75% of the desired total amount of air, other than for combustion enters here.

The products of combustion at around 3000° F., partially cooled by diluting air may be further cooled in the zone of cooling section 34 which may be provided with slots 36 extending therearound to stop the rotation of the gases.

The annular air space between combustor 15 and the shell casing 26 is closed at the discharge end inwardly of the transition piece 16, as shown in Fig. 2.

We have found that this type of combustor not only may be substantially shorter than with other types of fuel and air feed, but we also find that a substantially greater heat liberation may be accomplished with the highly rotating air column entering the combustion zone. The rotary effect of the air also materially improves atomization and dispersion of the fuel when introduced within the air column as by the multiple jets, although we are also aware that many advantages of our combustor can be accomplished by other fuel feed means.

A modified form of construction is shown in Fig. 5 utilizing a continuous annular combustor. As in Fig. 1 the casing shown at 10 is adapted to receive high pressure air from a compressor. This air is then mixed with fuel, burned, cooled and discharged through the turbine 18 to the jet space 20. As generally practiced in this construction an internal casing 60 is provided which is of annular construction and thus provides an annular air chamber 62 with the outer casing 10. It is within this chamber that the combustors generally indicated at 64, are placed.

As shown in Fig. 6, the combustor consists of an outer ring-like member 66 and an inner ring-like member 68 which in turn forms all of the operating spaces characteristic of a single combustor as shown in Fig. 1. The reduced diameter inlet end of the combustor 64 has a row of blades 70 which may be in two banks corresponding with the blades 38 in the mixer in Fig. 1. The air in passing between the blades into the mixing zone 72 will form a swirling or vortical column of air which will entrain the fuel discharged through the fuel nozzles 74. These are in turn supplied by the fuel line 76.

The annular vortical fuel-air column will then be discharged into the annular combustion zone 78 which of course is coextensive with the mixing zone 72. Combustion will be initiated therein in the usual manner and combustion will be substantially complete in a relatively short linear distance. Cooling of this chamber may be accomplished by passing some air through perforations 79.

The secondary air from chamber 62 for dilution of products of combustion then passes through the blades 80 which are similarly disposed with respect to a tangent as are the blades 70, and a fine dispersion of the cooling air in the products of combustion is accomplished.

If desired a tertiary set of blades 82 which may be oppositely disposed with respect to the blades 80 may be used for straightening the flame pattern and further dilution prior to the entry of the products of combustion into the transition piece 84. This transition piece may also have cooling scoops such as shown at 36 in Fig. 1. The transition piece 84 may also be provided with internal straightening vanes adjacent the exhaust to further straighten out the gas flow. A labyrinth seal may be used at 86 to prevent by-pass of the air.

It is contemplated that from 100 to 130% of the stoichiometric air will be fed into the primary air tuyere 70 and that from 25 to 75% of the balance of the air will be fed into the first diluting stage blades 80, with from 75 to 25% of the balance of the air fed through the blades 82.

An advantage of the single annular unit is not only the simplicity of construction but the opportunity of complete uniformity in discharge around the periphery of the transition piece 84.

It also has the advantage of full annular gas discharge around the periphery and thus may be made substantially smaller than the equivalent of a multi-unit construction.

We claim:

1. A combustor for a turbo-jet engine having a compressed air source and being adapted to discharge heated gases at uniform temperature to a gas turbine, which comprises a first cylindrical tuyere having a plurality of spaced, tangentially disposed blades forming primary air passages therebetween, one end of said first tuyere being closed and the opposite end being open; a casing surrounding said first tuyere and being spaced therefrom whereby the passage of air under pressure through said air passages forms a vortical air column within said first tuyere that moves outward through the open end thereof as an annulus adjacent the inner wall of said first tuyere; fuel feeding means adjacent the closed end of said first tuyere and having a fuel conduit extending into said first tuyere in a position to discharge the fuel into said vortical air column for intermixture therewith; and a combustion chamber having the shape of a curve of revolution and arranged within said casing in communication with the open end of said first tuyere, said combustion chamber being substantially larger in diameter than said first tuyere and including a second cylindrical tuyere formed in the wall thereof downstream of the initial combustion zone portion thereof, said second tuyere having a plurality of spaced, tangentially disposed blades forming secondary air passages therebetween in open communication with the casing, whereby supplementary air may be passed directly through said secondary air passages to uniformly blend unburned air with the products of combustion, said combustor having a restricted discharge outlet to induce blending of the gases before discharge from the combustor and extending through the discharge end of the casing.

2. The combination of claim 1 including a cooling zone section between said second tuyere and said discharge outlet and having slots formed therearound to receive cooling air from the casing space and stop rotation of the combustion gases.

References Cited in the file of this patent

UNITED STATES PATENTS

| | | |
|---|---|---|
| 2,398,654 | Lubbock et al. | Apr. 16, 1946 |
| 2,458,497 | Bailey | Jan. 11, 1949 |
| 2,475,911 | Nathan | July 12, 1949 |
| 2,510,645 | McMahan | June 6, 1950 |
| 2,543,762 | Christensen | Mar. 6, 1951 |
| 2,552,492 | Nathan | May 8, 1951 |
| 2,579,614 | Ray | Dec. 15, 1951 |
| 2,654,996 | Boninsegni | Oct. 13, 1953 |

FOREIGN PATENTS

| | | |
|---|---|---|
| 588,086 | Great Britain | May 14, 1947 |